US010279662B2

(12) United States Patent
Anderson et al.

(10) Patent No.: US 10,279,662 B2
(45) Date of Patent: May 7, 2019

(54) DATUM PIN ASSEMBLY

(71) Applicant: Honda Motor Co., Ltd., Tokyo (JP)

(72) Inventors: Erik R Anderson, Marysville, OH (US); Khang C Nguyen, Columbus, OH (US); Nathan Dimick, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 15/288,763

(22) Filed: Oct. 7, 2016

(65) Prior Publication Data

US 2018/0099546 A1 Apr. 12, 2018

(51) Int. Cl.
*B60J 5/04* (2006.01)
*B60J 5/06* (2006.01)
*E05D 15/06* (2006.01)

(52) U.S. Cl.
CPC ............. *B60J 5/0468* (2013.01); *B60J 5/06* (2013.01); *E05D 15/0621* (2013.01); *E05Y 2900/531* (2013.01)

(58) Field of Classification Search
CPC ................................ B60J 5/0463; B60J 5/0468
See application file for complete search history.

(56) References Cited

U.S. PATENT DOCUMENTS

| | | | |
|---|---|---|---|
| 1,878,363 A | 9/1932 | Morris | |
| 3,889,316 A * | 6/1975 | Koike | E05D 11/1042 16/297 |
| 4,569,553 A * | 2/1986 | Speth | B60J 5/06 296/155 |
| 4,803,756 A | 2/1989 | Hufnagel | |
| 4,864,687 A * | 9/1989 | Calcaterra | E05D 7/1005 16/237 |
| 5,297,314 A * | 3/1994 | Bender | E05D 7/121 16/270 |
| 5,791,723 A * | 8/1998 | Bell | B60J 5/06 16/86 B |
| 6,334,236 B1 * | 1/2002 | Kalliomaki | E05D 11/1057 16/334 |
| 6,918,167 B2 | 7/2005 | Hughes et al. | |
| 7,430,785 B2 * | 10/2008 | Brown | E05D 11/1042 16/286 |
| 8,627,871 B2 * | 1/2014 | Aquilina | E05F 15/59 160/188 |

(Continued)

FOREIGN PATENT DOCUMENTS

EP 2933126 A1 * 10/2015 ............ B60J 5/0468
FR 3033309 A1 * 9/2016 ................ B60J 5/06

*Primary Examiner* — Catherine A Kelly
(74) *Attorney, Agent, or Firm* — Honda Patents & Technologies North America, LLC; Mark E. Duell

(57) ABSTRACT

A system and method for assembling a door to a motor vehicle is disclosed including a bracket assembly that includes a bracket having a first pair of holes and a second pair of holes, and weld nuts welded to the bracket, the weld nuts being aligned with the first pair of holes. The system further includes an alignment piece having first and second alignment holes, the first alignment hole corresponding to a first of the second pair of holes of the bracket, the second alignment hole corresponding to a second of the second pair of holes of the bracket, datum pins inserted through the first and second alignment holes and the second pair of holes in the bracket, and a roller assembly fixedly attached to the bracket.

17 Claims, 11 Drawing Sheets

(56) References Cited

U.S. PATENT DOCUMENTS

| | | | |
|---|---|---|---|
| 9,151,098 B2* | 10/2015 | Yamada | B60J 5/06 |
| 9,308,954 B2* | 4/2016 | Wilkens | B62D 65/026 |
| 9,382,733 B2* | 7/2016 | Duong | B60J 5/0463 |
| 9,562,382 B2* | 2/2017 | Dey | E05D 11/1014 |
| 9,731,583 B2* | 8/2017 | Maruyama | B60J 5/047 |
| 10,161,166 B2* | 12/2018 | Edwards | B60J 5/0416 |
| 2003/0182761 A1* | 10/2003 | Kidd | E05D 5/121 16/386 |
| 2006/0096176 A1* | 5/2006 | Greuel | E05B 81/22 49/324 |
| 2014/0165387 A1 | 6/2014 | Jin | |
| 2014/0167342 A1 | 6/2014 | Jin | |

\* cited by examiner

DATUM PIN ASSEMBLY

TECHNICAL FIELD

The embodiments described herein are directed to brackets and the assembly thereof used for doors of motor vehicles.

BACKGROUND

For sliding doors for a motor vehicle, a bracket is attached to the door to locate a center roller assembly that sits in a rail attached to the body. The bracket supports approximately 25% of the door weight. The door bracket mating structure is welded into the door to receive the roller assembly.

In the past, alignment of the roller assembly with the door bracket was achieved using a jig. The bracket was provided with datum holes for receiving alignment pins from the jig. Additional alignment pins from the jig were inserted into receptacles in the inner panel of the door to align bolt holes on the bracket with bolt holes in the inner panel. The bolt holes on the bracket were oversized to allow for proper alignment of the bracket. The bracket was then bolted to the door panel, and the jig was removed.

However, design considerations may make complicate or prohibit the use of a jig. Therefore, there is a need for an improved alignment system for installing a roller assembly to the door panel that does not require a jig.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a system for assembling a door for a motor vehicle includes a bracket assembly. The bracket assembly includes a bracket, the bracket having a first fastener hole and a second fastener hole and a first pin hole and a second pin hole, and a pair of fasteners welded to the bracket, the fasteners being aligned with the first and second fastener holes. The system further includes an alignment piece positioned on a first side of the bracket, the alignment piece having a first alignment hole and a second alignment hole corresponding to the first and second pin holes of the bracket, a first datum pin inserted through the first alignment hole and the first pin hole in the bracket, a second datum pin inserted through the second alignment hole and the second pin hole in the bracket, and a roller assembly positioned on a second side of the bracket that receives the first and second datum pins and is attached to the bracket assembly.

According to another aspect, a method for assembling a roller assembly to a door for a motor vehicle includes the steps of assembling a bracket assembly, the bracket assembly having a first fastener hole, a second fastener hole, a first pin hole, a second pin hole, and fasteners welded to the bracket assembly, the fasteners being aligned with the first and second fastener holes, assembling an alignment piece, the alignment piece having first and second alignment holes, the first alignment hole corresponding to the first pin holes of the bracket assembly, the second alignment hole corresponding to the second pin hole of the bracket assembly, inserting datum pins through the first and second alignment holes and the second pair of holes in the bracket, and attaching the roller assembly to the bracket assembly.

According to yet another aspect, a bracket assembly for a sliding door of a motor vehicle includes a door panel comprising a first side and a second side, the door panel defining a first hole and a second hole there through, a bracket including a fastener receiving member, the bracket is fixedly secured to the first side of the door panel with the fastener receiving member aligned with the second hole of the door panel to receive a roller assembly fastener installable through the second hole of the door panel from the second side of the door panel, and a datum pin movably secured to the bracket, the datum pin includes a first end that extends outward from the bracket through the first hole of the door panel to the second side of the door panel, the datum pin is movable from the second side of the door panel along the door panel with respect to the second hole of the door panel.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
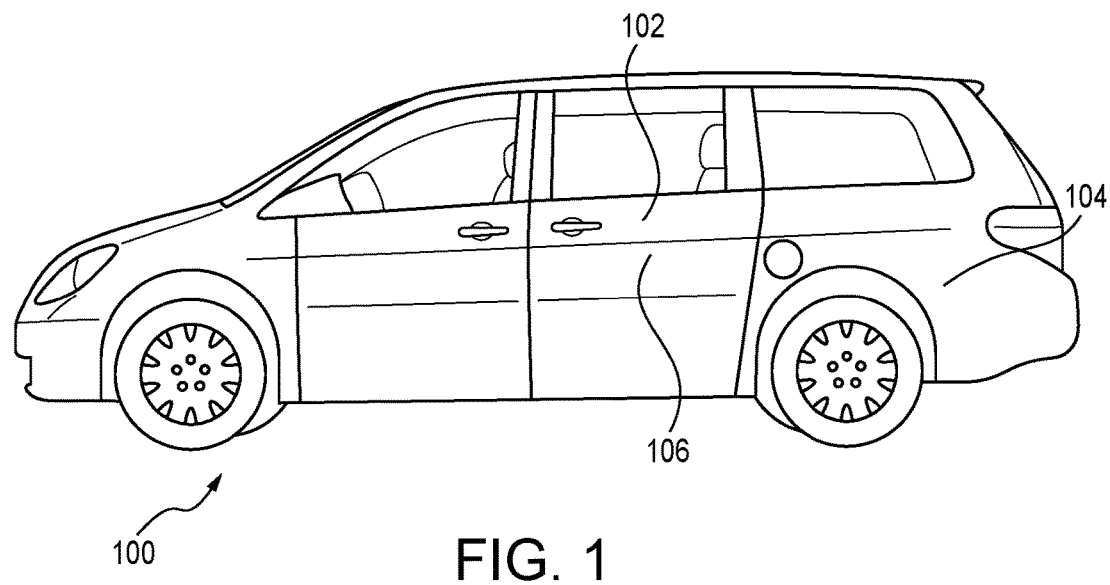
FIG. 1 is a side view of a motor vehicle with a sliding door in a closed position.
Figure 2:
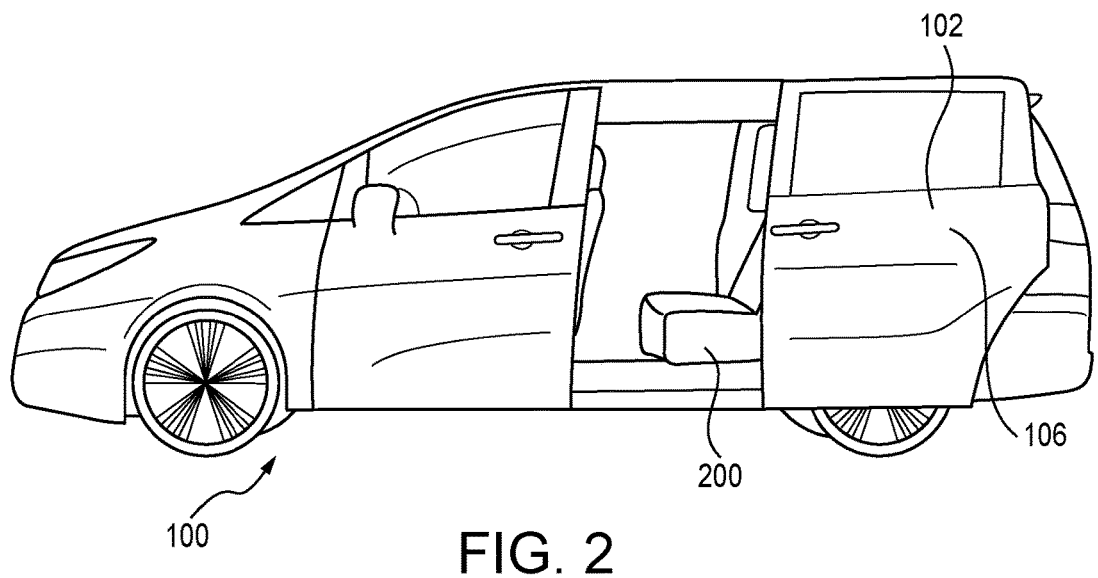
FIG. 2 is a side view of the motor vehicle of claim 1 with the sliding door in an open position.

FIGS. 1 and 2 show a side view of a motor vehicle 100 with a sliding door 102. FIG. 1 shows the sliding door 102 in a closed position, and FIG. 2 shows the sliding door 102 in the open position, thereby providing entry to a second row of seats 200.

Figure 3:
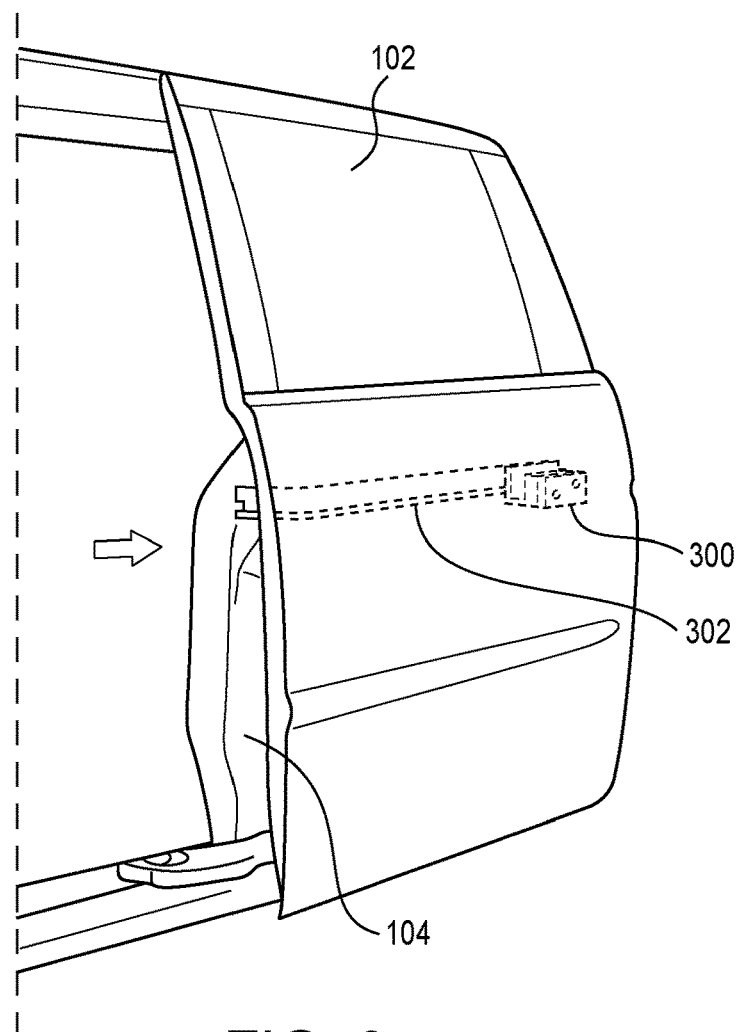
FIG. 3 is a transparent perspective view of the sliding door illustrating the location of a roller assembly.
Figure 4:
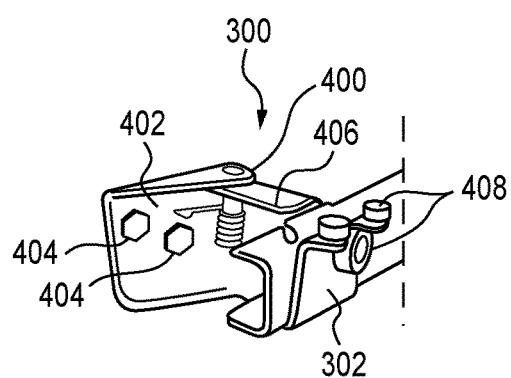
FIG. 4 is a close up view of the roller assembly of FIG. 3.

FIG. 3 shows a transparent perspective view of a sliding door 102. The sliding door 102 includes a roller assembly 300 that is fixedly attached to the sliding door 102 and rolls within a slide rail 302 located in the rear side panel 104 of the motor vehicle. FIG. 4 illustrates a close-up view of the roller assembly 300. The roller assembly 300 includes a generally L-shaped roller bracket 400. A first surface 402 of the roller bracket 400 is fixedly attached to the sliding door 102 by two fasteners 404, preferably bolts, or any other suitable fasteners, including, but not limited to rivets, screws, and the like. Extending from a second surface 406 of the roller bracket 400 are rollers 408 that permit longitudinal movement of the roller bracket 400 within the slide rail 302 as the sliding door 102 moves from a closed position to an open position, and from the open position to the closed position.

With regards to FIGS. 5-10, the system and method for attaching the roller assembly 300 to the sliding door 102 are discussed below.

Figure 5:
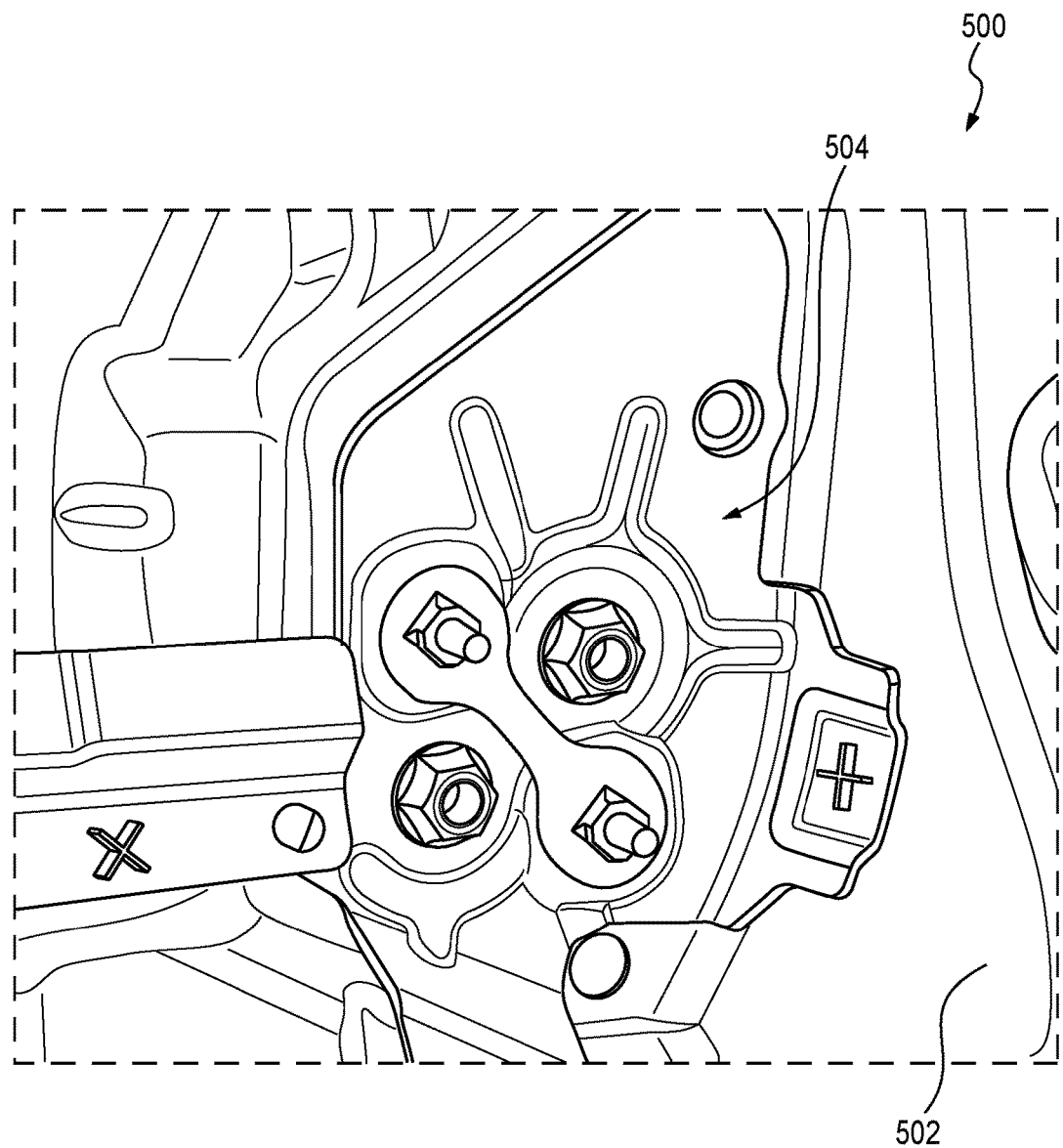
FIG. 5 is a side view of a bracket assembly for fixedly securing the roller assembly to the sliding door.
Figure 6:
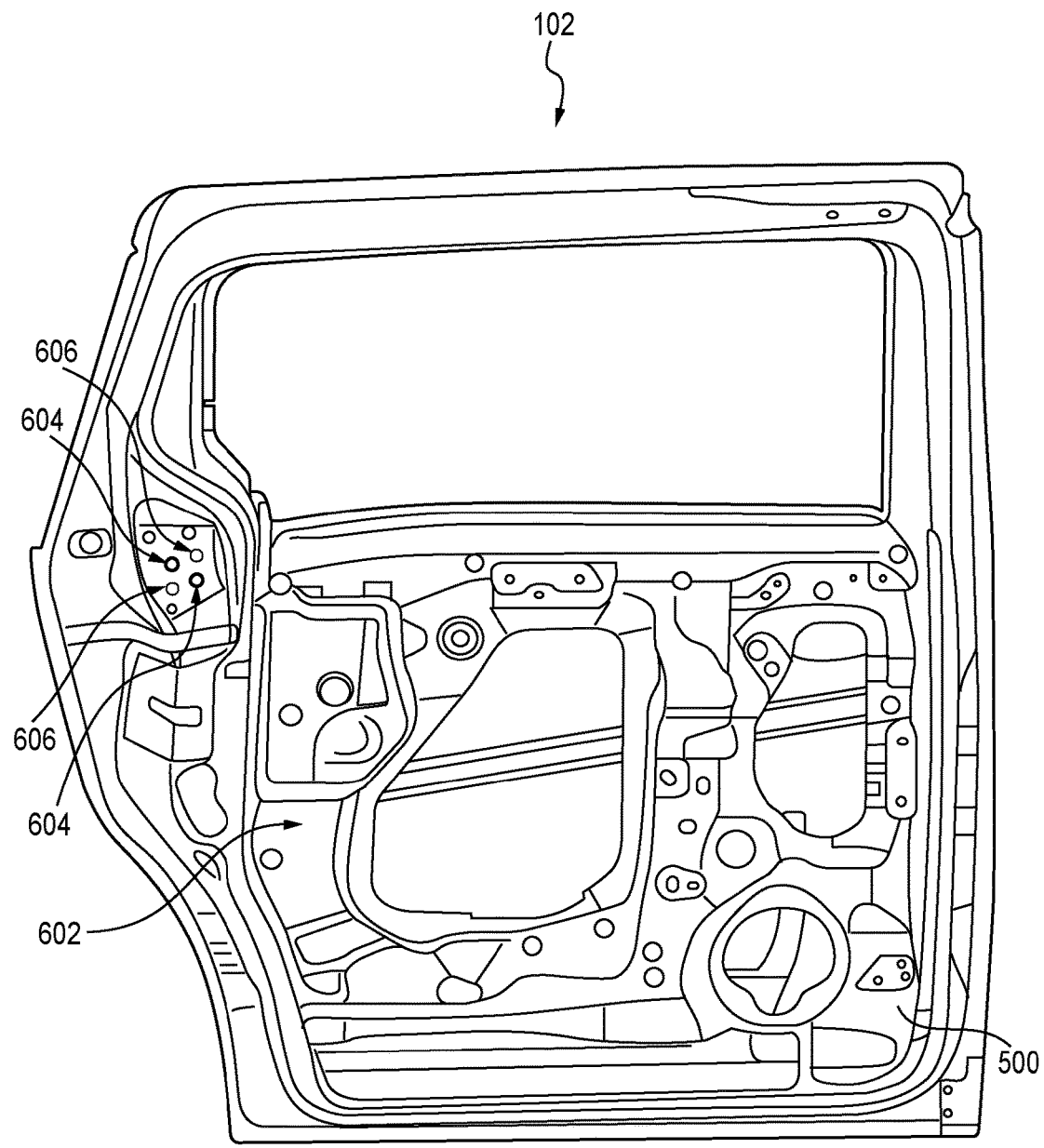
FIG. 6 is an interior view of a sliding door.
Figure 7:
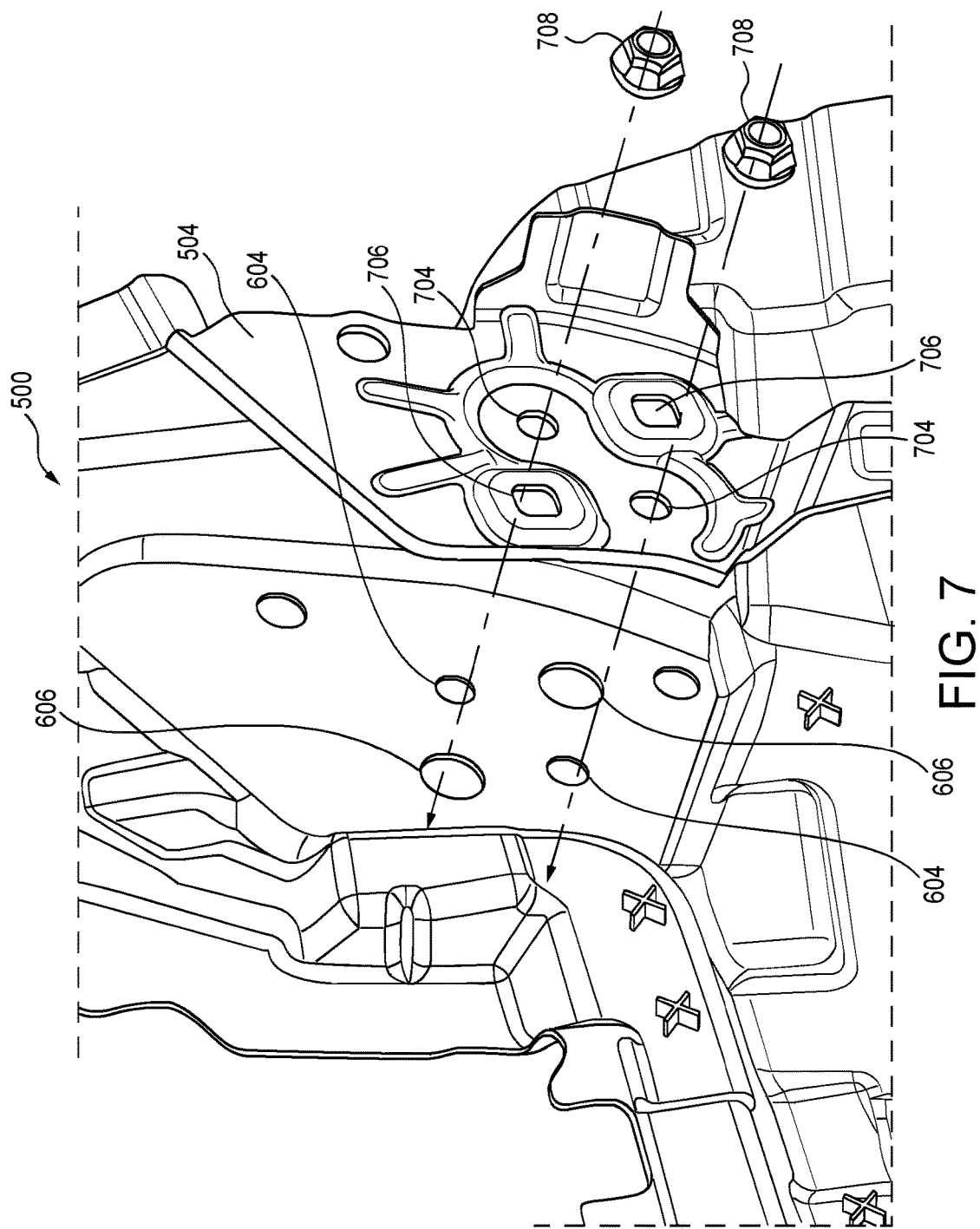
FIG. 7 is an exploded perspective view of the bracket assembly.

FIG. 5 shows an outer side 502 of a door panel 500 of the sliding door 102 with the outer body sheet metal 106 removed. The roller assembly 300 is fixedly attached to the inner side 602 of the door panel 500 of the sliding door 102, which is illustrated in FIG. 6 prior to assembly of the roller assembly 300. The door panel 500 includes one pair of weld nut holes 604 and one pair of datum pin holes 606.

Figure 13:
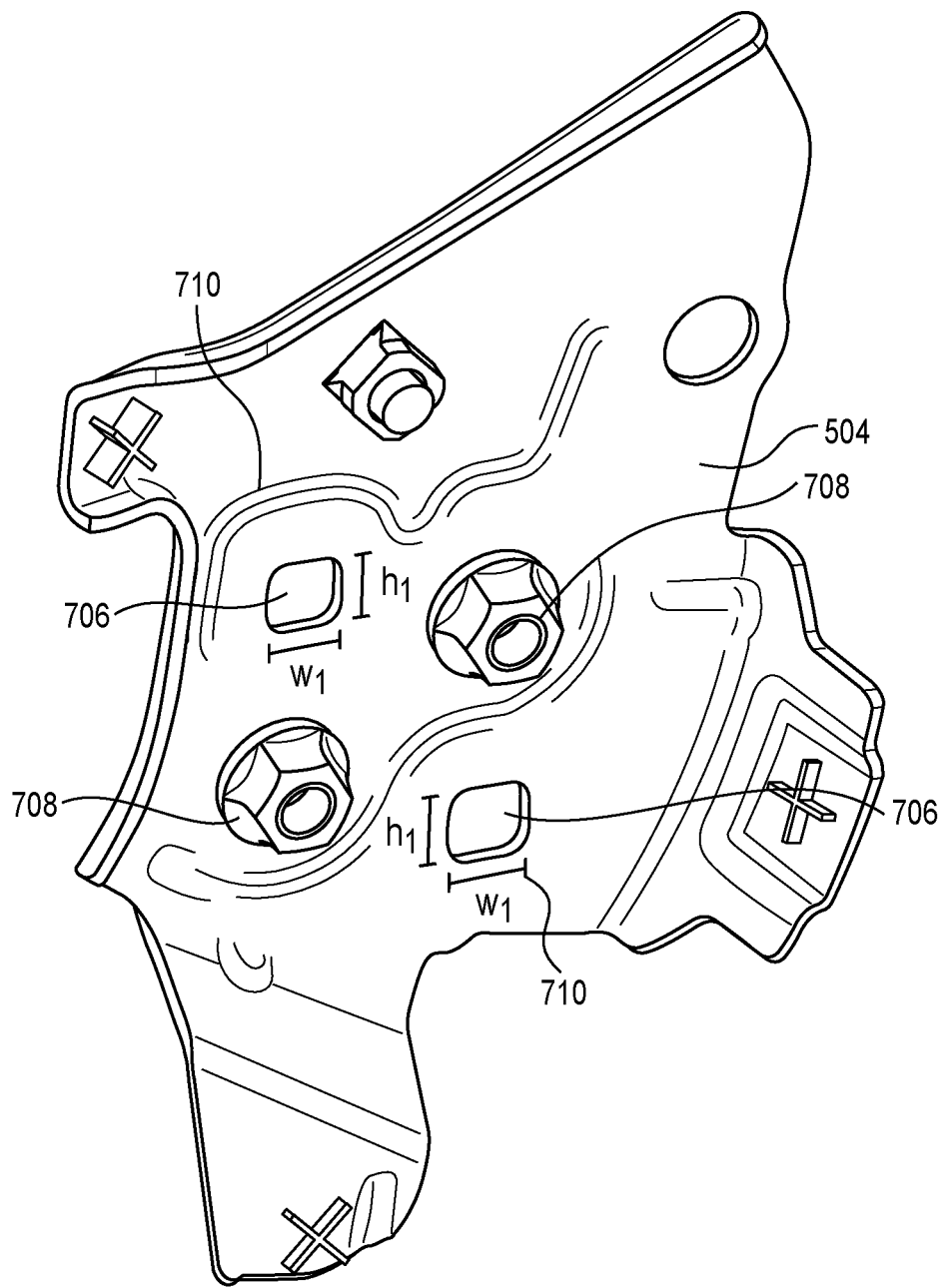
FIG. 13 is a perspective view of a bracket assembly.

With continuing reference to FIG. 5, a bracket assembly 504 is attached to the outer side 502 of the door panel 500. The bracket assembly 504 is attached to the outer side 502 of the door panel 500 by welding, mechanical fasteners, adhesives, or by any other suitable method known to one skilled in the art. The bracket assembly 504 includes a pair of bracket weld nut holes 704, shown in the exploded view illustrated in FIG. 7, that correspond with the weld nut holes 604 of the door panel 500. Further, the bracket assembly 504 includes a pair of bracket datum pin holes 706 that correspond with the pair of datum pin holes 606 in the door panel 500. The bracket datum pin holes 706 are each located in an embossed region 710. The bracket assembly 504 does not contact the outer side 502 of the door panel 500 in the embossed region 710. In the embodiments described herein, as illustrated in FIG. 13, the bracket datum pin holes 706 are substantially square-shaped to manage the adjustment of the datum pins 800, illustrated and discussed in further detail with respect to FIG. 8.

The bracket assembly 504 also includes a pair of fasteners 708, such as weld nuts, that correspond with the weld nut holes 604 and bracket weld nut holes 704. The fasteners 708 are attached to the bracket assembly 504 by welding or any other suitable method, which may include physical attachment, being integrated within the bracket assembly 504, adhesives, or any other suitable method known to one skilled in the art.

Figure 8:
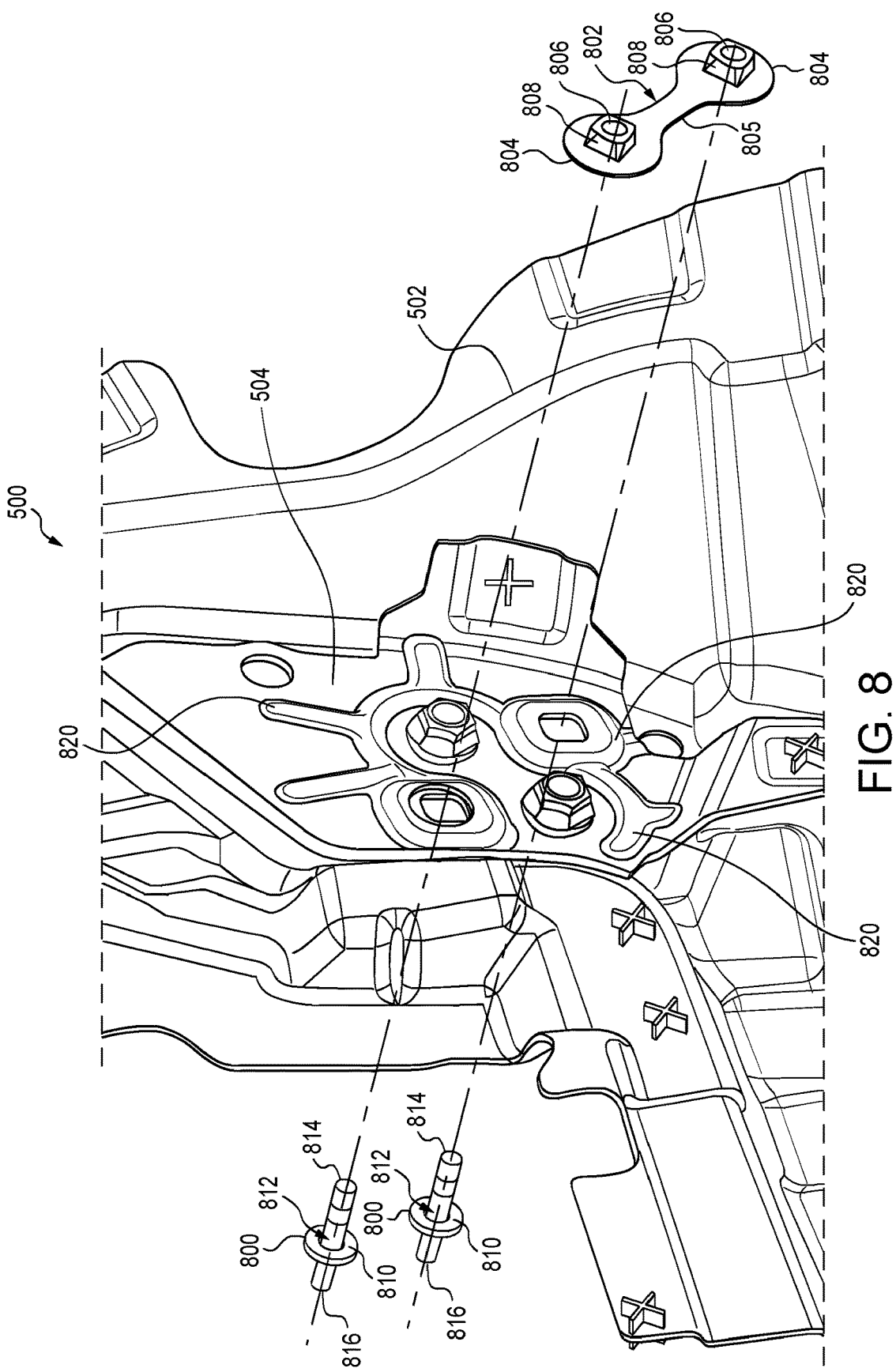
FIG. 8 is an exploded perspective view of the bracket assembly and datum pins.
Figure 9:
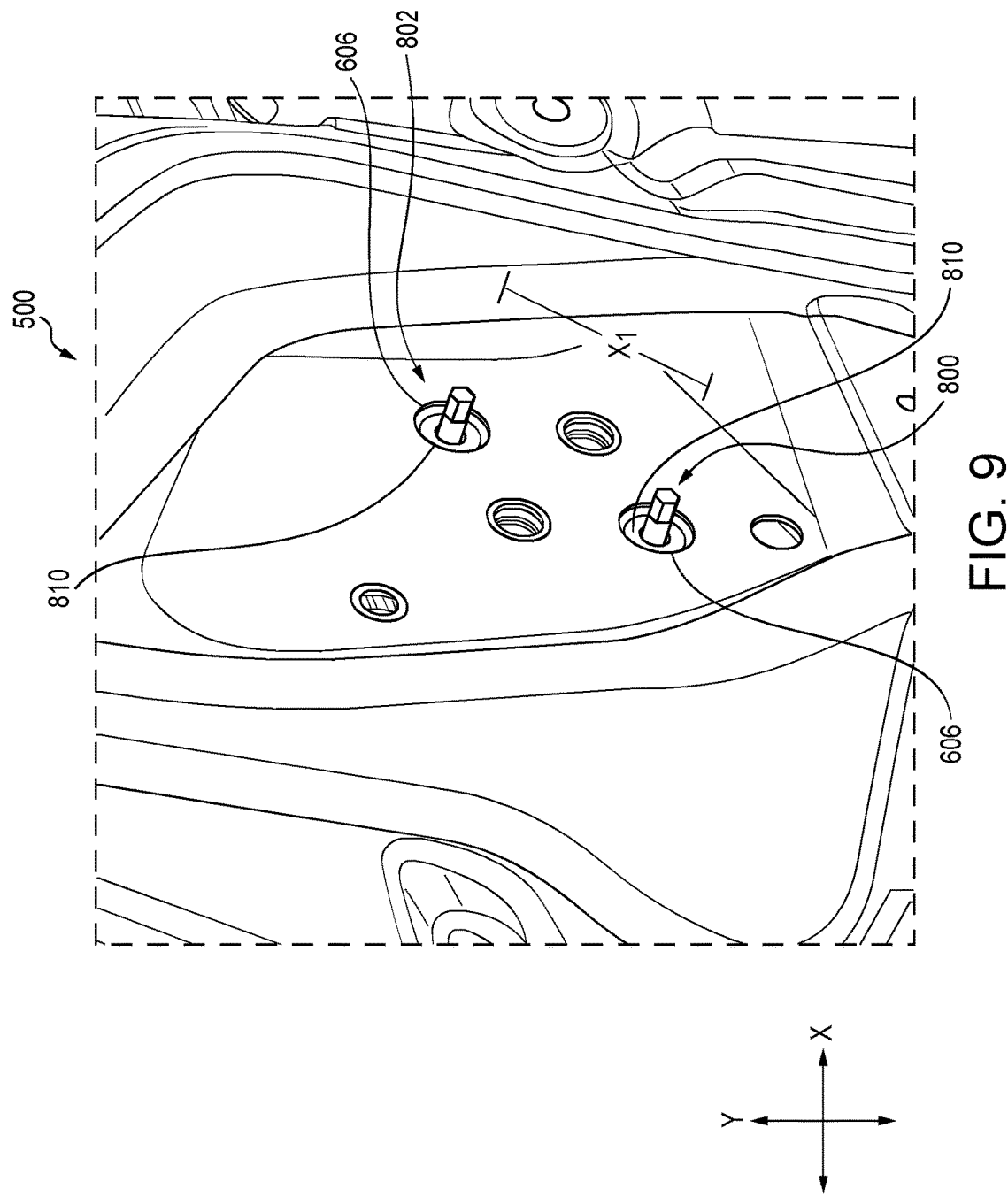
FIG. 9 is a perspective view of a door interior and datum pins.
Figure 11:
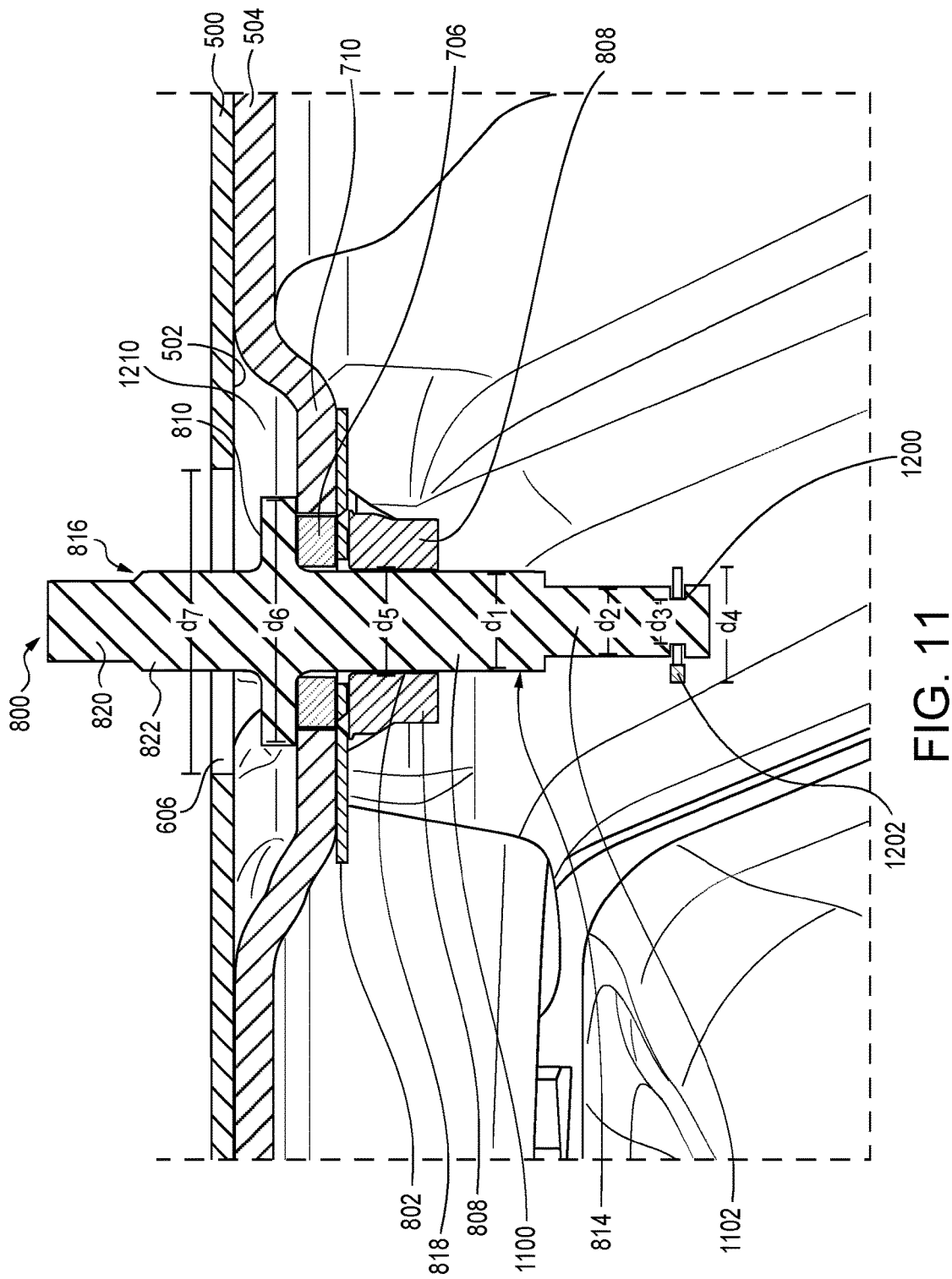
FIG. 11 is a cross-section view of a datum pin.

FIG. 8 shows an exploded view of the bracket assembly 504 and the installation of a pair of datum pins 800 and an alignment piece 802 for receiving the datum pins 800. The alignment piece 802 is substantially flat and dogbone-shaped, with two rounded ends 804 located on opposite ends of a central portion 805. The alignment piece 802 includes a pair of alignment datum holes 806, each of which includes a receiver 808 for receiving one of the datum pins 800. The bracket assembly 504 include a number of raised ridges 820 of varying As illustrated in FIGS. 8-9 and 11, the pair of datum pins 800 include a flange 810 that extends radially outward from a central portion 812 of each of the datum pins 800. A first end 814 of each of the datum pins 800 is designed to be received by each of the receivers 808 of the alignment piece 802. The first end 814 of each of the datum pins 800 may be threaded for insertion, from the inner side 602 of the door panel 500, through the datum pin holes 606, the bracket datum pin holes 706, and the alignment datum holes 806 into one of the receivers 808, which also includes an internally threaded hole 818. In the embodiment illustrated in FIG. 11, The first end 814 of each the datum pins, adjacent the flange 810, has a threaded region 1100, which has a diameter $d_1$ and a no thread region 1102, which has a diameter $d_2$ that is less than diameter $d_1$. The reduced diameter $d_2$ of the no thread region 1102 ensures that the no thread region 1102 freely rotates within the receiver 808.

Figure 12:
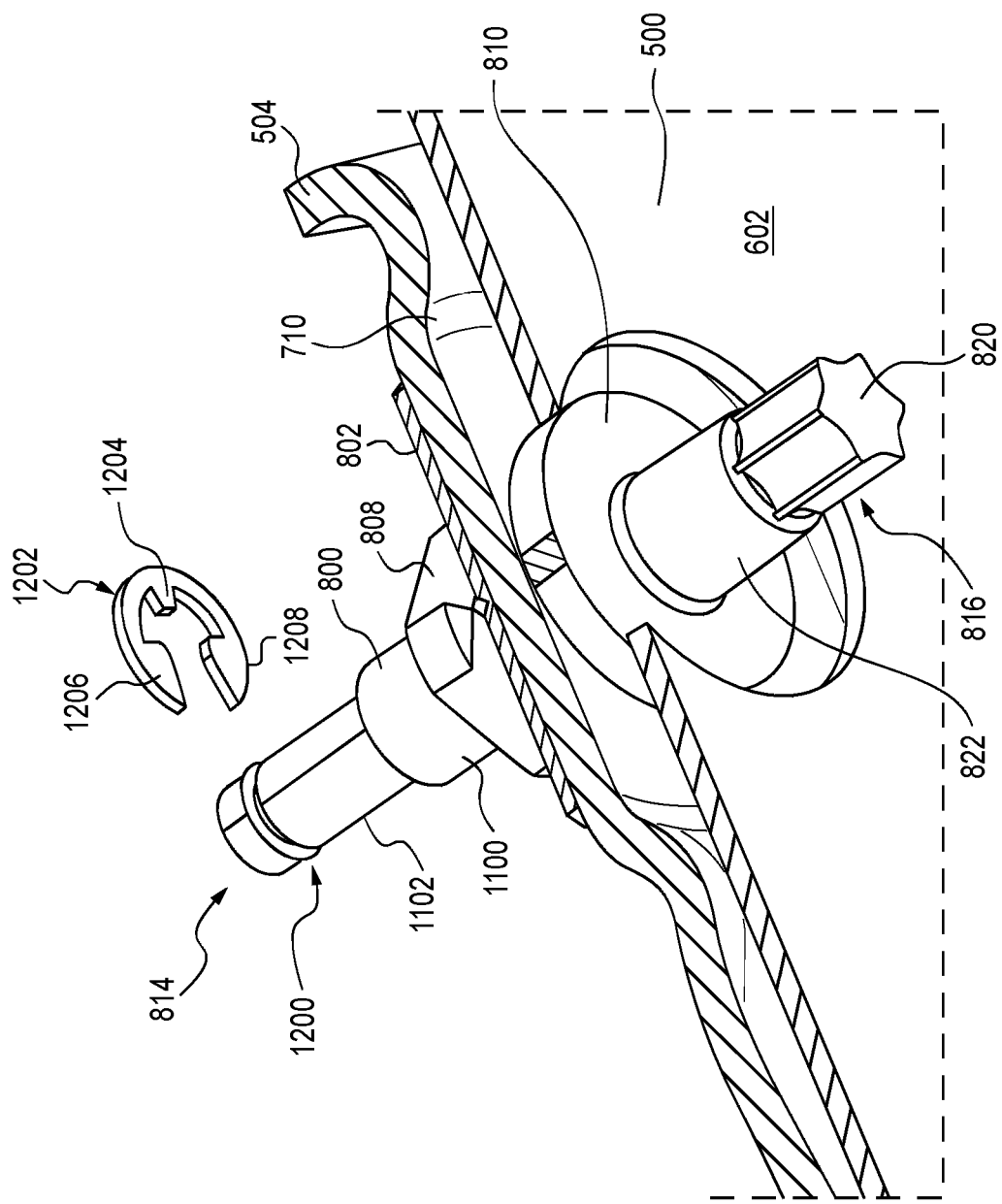
FIG. 12 is a cross-section view of a perspective view of a datum pin and an exploded view of a an E-clip.

In a further embodiment, illustrated in FIG. 11-12, each of the datum pins 800 may include a clip region 1200, located in the no thread region 1102 of the first end 814 of each of the datum pins 800. The clip region has a diameter $d_3$, which is less than diameter $d_2$. A clip 1202, such as a so-called E-clip, may be located in the clip region as illustrated in the FIG. 11. The clip 1202 is generally semi-circular in shape with a central rib 1204, which abuts the clip region 1200. The clip 1202 is fixedly secured to the clip region 1200 by an interference fit caused by the ends 1206, 1208 being spread apart as the clip 1202 is inserted around the clip region 1200 and returning to a resting position upon completion of the installation process. In the installed position, the clip 1202 has a diameter $d_4$ greater than diameter $d_5$ of each of the threaded holes 818 of the receivers 808.

A second end 816 of each of the datum pins 800 has a hexagonal or six-lobe wrench portion 820, which enables the datum pins 800 to be rotated by a socket-type tool (not shown), and a datum portion 822, for holding the roller assembly 300 during installation.

The flange 810 has a diameter $d_6$ that is less than the diameter $d_7$ of the datum pin holes 606, and thus passes on to the outer side 502 of the door panel 500. The diameter $d_6$ is, however, greater than either the heighth $h_1$ or width $w_1$ of the bracket datum pin holes 706 ensuring that the flange 810 of the datum pins 800 will remain in the area 1210 between the outer side 502 of the door panel 500 and the embossed region 710 of the bracket assembly 504 when the datum pins 800 are inserted into and engaged with the receivers 808 of the alignment piece 802, which are located on the outside 502 of the door panel 500.

As illustrated in FIG. 9, with the flange 810 preventing datum pins 800 inserted into the receivers 808 of the alignment piece 802 from passing completely through the datum pin holes 606, the datum pins 800 may be moved in either the x or y directions, as depicted in FIG. 9. The alignment piece 802, into which the datum pins 800 are inserted, ensure the datum pins 800 maintain a constant distance $x_1$ from one another. While the datum pins 800 are tightened when inserted into the receivers 808, they are preferably not tightened completely to allow freedom of the movement of the datum pins 800 and the alignment piece 802 until the final position of the datum pins 800 is determined, at which point they may be tightened to create a friction fit that prevents motion of the datum pins 800. The final position of the datum pins 800 may be determined using a jig during the assembly process, or by any other method known to those skilled in the art.

Figure 10:
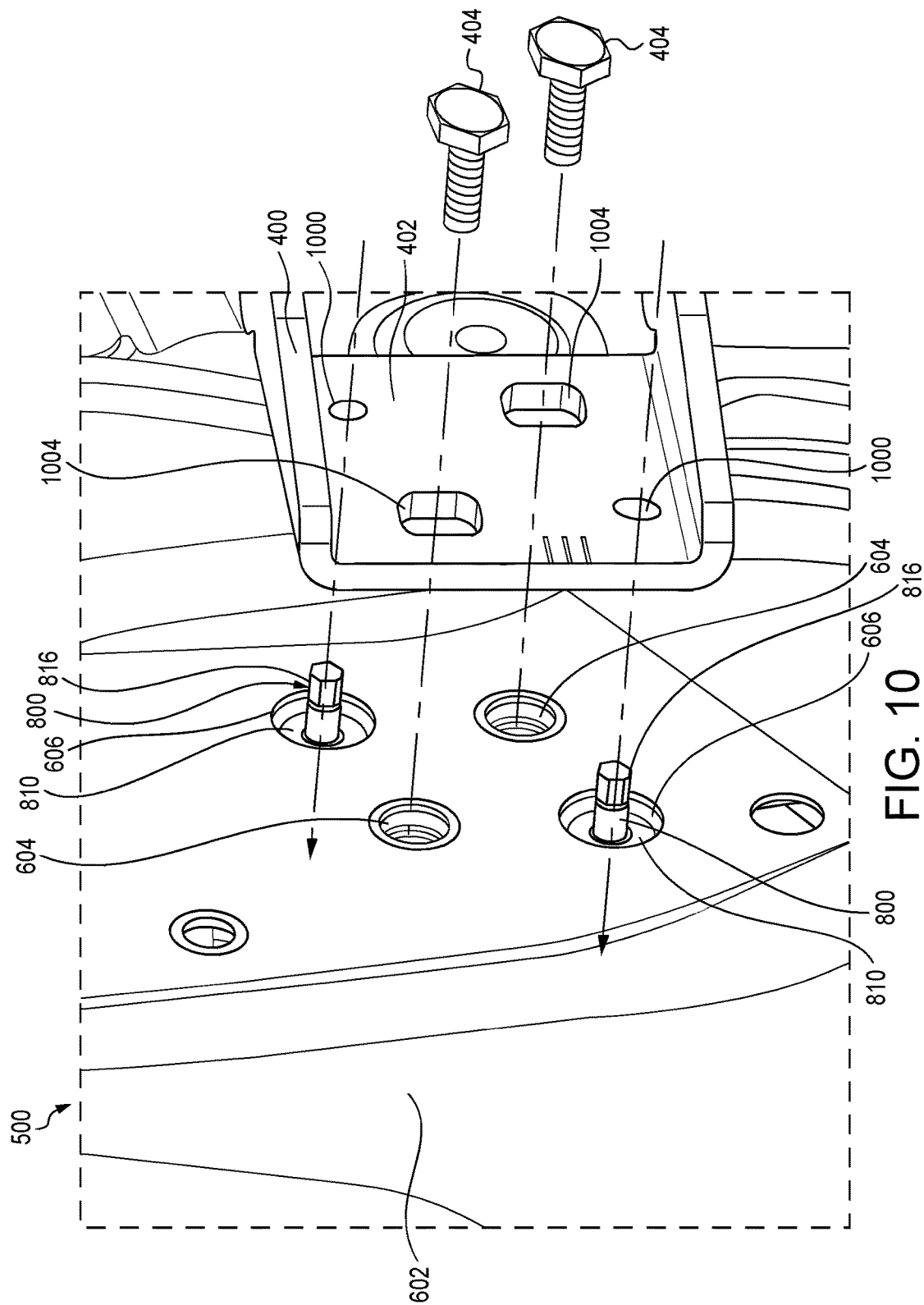
FIG. 10 is an exploded perspective view showing the door interior and roller assembly.

FIG. 10 is an exploded view illustrating the assembly of the first surface 402 of the roller bracket 400 of the roller assembly 300 to the inside 602 of the door panel 500. Datum pin alignment holes 1000 in the first surface 402 corresponding with each of the datum pins 800 are aligned, and the first surface 402 of the roller bracket is moved into engagement with the inner surface 602 of the door panel 500. The datum pins 800 are inserted into datum pin alignment holes 1000. Weld nut bracket holes 1004 are aligned with the weld nut holes 604 in the door panel 500. The final step of installation is to insert fasteners 404 through the weld nut bracket holes 1004, the weld nut holes 604, the bracket weld nut holes 704, and into the fasteners 708. The fasteners 404 illustrated in FIG. 10 are bolts, but other types of mechanical fasteners may be used such as rivets, screws, and the like. The fasteners 404 are tightened to complete installation.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A system for assembling a door for a motor vehicle, comprising:
    a bracket assembly, comprising:
        a bracket, the bracket having a first fastener hole and a second fastener hole and a first pin hole and a second pin hole; and
        a pair of fasteners welded to the bracket, the fasteners being aligned with the first and second fastener holes;
    an alignment piece positioned on a first side of the bracket, the alignment piece having a first alignment hole and a second alignment hole corresponding to the first and second pin holes of the bracket;
    a first datum pin inserted through the first alignment hole and the first pin hole in the bracket;
    a second datum pin inserted through the second alignment hole and the second pin hole in the bracket;
    a roller assembly positioned on a second side of the bracket that receives the first and second datum pins and is attached to the bracket assembly.

2. The system of claim 1 further comprising:
    a stiffener welded to the bracket for strengthening the bracket.

3. The system of claim 1 wherein the alignment piece comprises:
    a central portion;
    a first end adjacent the central portion, the first alignment hole located within the first end; and
    a second end adjacent the central portion and opposite the first end, the second alignment hole located within the second end.

4. The system of claim 1 further comprising:
    a door panel including a first side and a second side;
    wherein the bracket assembly is positioned on the first side of the door panel, and the roller assembly is positioned on the second side of the door panel.

5. The system of claim 4 wherein each of the first and second datum pins comprises:
    a flange having a diameter that is greater than a diameter of the first and second pin holes;
    wherein the flange of each of the datum pins is positioned between the first side door panel and the bracket assembly.

6. The system of claim 5 wherein the bracket assembly further comprises:
    a first embossed portion surrounding the first pin hole, the first embossed portion being generally recessed and concave;
    a second embossed portion surrounding the second pin hole, the second embossed portion being generally recessed and concave;
    wherein the flange of each of the first datum pins is received in the concave portion of the first embossed portion; and
    wherein the flange of each of the second datum pins is received in the concave portion of the second embossed portion.

7. The system of claim 6 wherein the first pin hole and second pin hole are generally rectangular in shape having a length and a width, the diameter of the flange of each of the datum pins being greater than the length or width of each of the pin holes.

8. The system of claim 7 wherein each of the first and second datum pins further comprises:
    a first end on a first side of the flange, the first end having a threaded portion having a first diameter and a non-threaded portion having a second diameter, the second diameter being less than the first diameter.

9. The system of claim 8 wherein each of the first and second datum pins further comprises:
    a clip portion located in the non-threaded portion of the first end, the clip portion having a third diameter less than the second diameter; and
    an E-clip disposed in the clip portion, the E-clip having a fourth diameter greater than the first diameter of the threaded portion.

10. The system of claim 7 wherein the first pin hole and second pin are generally square-shaped.

11. The system for assembling a door of claim 7 wherein the door panel defines a first hole and a second hole therethrough, wherein the first hole of the door panel is aligned with the first hole of the bracket and the first datum pin extends through the first hole of the door panel to the second side of the door panel, wherein the diameter of the first hole of the door panel is greater than the diameter of the flange of the first datum pin, wherein the second hole of the door panel is aligned with the second hole of the bracket and the second datum pin extends through the second hole of the door panel to the second side of the door panel, wherein the diameter of the second hole of the door panel is greater than the diameter of the flange of the second datum pin.

12. A method for assembling a roller assembly to a door for a motor vehicle, comprising the steps of:
    assembling a bracket assembly, the bracket assembly having a first fastener hole, a second fastener hole, a first pin hole, a second pin hole, and fasteners welded to the bracket assembly, the fasteners being aligned with the first and second fastener holes;
    assembling an alignment piece, the alignment piece having first and second alignment holes, the first alignment hole corresponding to the first pin holes of the bracket assembly, the second alignment hole corresponding to the second pin hole of the bracket assembly;
    inserting datum pins through the first and second alignment holes and the second pair of holes in the bracket; and
    attaching the roller assembly to the bracket assembly.

13. A bracket assembly for a sliding door of a motor vehicle, the assembly comprising:
- a door panel comprising a first side and a second side, the door panel defining a first hole and a second hole therethrough;
- a bracket including a fastener receiving member, the bracket is fixedly secured to the first side of the door panel with the fastener receiving member aligned with the second hole of the door panel to receive a roller assembly fastener installable through the second hole of the door panel from the second side of the door panel; and
- a datum pin movably secured to the bracket, the datum pin includes a first end that extends outward from the bracket through the first hole of the door panel to the second side of the door panel, the datum pin is movable from the second side of the door panel along the door panel with respect to the second hole of the door panel wherein the door panel defines a third hole therethrough,
- the bracket includes a first side and a second side,
- the bracket defines a first hole and a second hole therethrough, the second side of the bracket is positioned opposite the first side of the door panel,
- an alignment piece is positioned on the first side of the bracket,
- the datum pin is secured to the alignment piece and extends through the first hole of the bracket and the first hole of the door panel to the second side of the door panel, and
- a second datum pin is secured to the alignment piece and extends through the second hole of the bracket and the third hole of the door panel to the second side of the door panel, wherein the first and the second datum pins are movable from the second side of the door panel along the door panel with respect to the second hole of the door panel.

14. The bracket assembly of claim 13 wherein the datum pin includes a second end that extends away from the first end of the datum pin and through the first hole of the bracket beyond the first side of the bracket, wherein the datum pin includes a retaining member having a diameter that is greater than the diameter of the first hole of the bracket, and wherein the retaining member of the datum pin is positioned on the second side of the bracket.

15. The bracket assembly of claim 13 wherein the first datum pin includes a retaining member having a diameter that is greater than a diameter of the first hole of the bracket, the second datum pin includes a retaining member having a diameter that is greater than the diameter of the second hole of the bracket, and the first retaining member and the second retaining member are positioned on the second side of the bracket.

16. The bracket assembly of claim 15 wherein the second side of the bracket assembly includes a first concave portion and a second concave portion, wherein the retaining member of the first datum pin is positioned in the first concave portion and the retaining member of the second datum pin is positioned in the second concave portion.

17. The bracket assembly of claim 16 wherein the diameter of the retaining member of the first datum pin is less than the diameter of the first hole of the door panel and the diameter of the retaining member of the second datum pin is less than the diameter of the third hole of the door panel.

* * * * *